(12) United States Patent
Shimomura (10) Patent No.: US 10,727,519 B2
(45) Date of Patent: Jul. 28, 2020

(54) MANUFACTURING METHOD AND APPARATUS FOR FUEL CELL STACK

(71) Applicant: HONDA MOTOR CO., LTD., Minato-ku, Tokyo (JP)

(72) Inventor: Yo Shimomura, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 146 days.

(21) Appl. No.: 16/008,067

(22) Filed: Jun. 14, 2018

(65) Prior Publication Data

US 2018/0366760 A1    Dec. 20, 2018

(30) Foreign Application Priority Data

Jun. 20, 2017    (JP) .................................. 2017-120434

(51) Int. Cl.
*H01M 8/2404* (2016.01)
*H01M 8/248* (2016.01)
*H01M 8/2475* (2016.01)
*H01M 8/1004* (2016.01)
*H01M 8/1018* (2016.01)

(52) U.S. Cl.
CPC ......... *H01M 8/2404* (2016.02); *H01M 8/248* (2013.01); *H01M 8/1004* (2013.01); *H01M 8/2475* (2013.01); *H01M 2008/1095* (2013.01); *H01M 2300/0082* (2013.01)

(58) Field of Classification Search
None
See application file for complete search history.

(56) References Cited

FOREIGN PATENT DOCUMENTS

JP    2009-123616    6/2009
JP    2012-185920    9/2012

OTHER PUBLICATIONS

Machine Translation of JP 2009-123616 (Year: 2009).*
Japanese Office Action for Japanese Patent Application No. 2017-120434 dated Feb. 19, 2019.

* cited by examiner

*Primary Examiner* — Wyatt P McConnell
(74) *Attorney, Agent, or Firm* — Amin, Turocy & Watson, LLP (57) ABSTRACT

A manufacturing apparatus for a fuel cell stack includes a pressing unit, an overall load detection unit, and an electrode load detection unit. The pressing unit presses the entirety of a stack body containing multiple power generation cells stacked together, along a stacking direction. The overall load detection unit detects an overall load acting on the entire stack body including a seal stack portion in which seal members are stacked and an electrode stack portion in which electrodes are stacked when the stack body is pressed by the pressing unit. The electrode load detection unit detects an electrode load acting on the electrode stack portion when the stack body is pressed by the pressing unit.

6 Claims, 4 Drawing Sheets

MANUFACTURING METHOD AND APPARATUS FOR FUEL CELL STACK

CROSS-REFERENCE TO RELATED APPLICATION

This application is based upon and claims the benefit of priority from Japanese Patent Application No. 2017-120434 filed on Jun. 20, 2017, the contents of which are incorporated herein by reference.

BACKGROUND OF THE INVENTION

Field of the Invention

The present invention relates to a manufacturing method and apparatus for a fuel cell stack that includes a stack body having multiple power generation cells stacked together.

Description of the Related Art

A solid polymer electrolyte fuel cell, for example, includes a membrane electrode assembly (MEA) having a solid polymer electrolyte membrane and electrodes disposed on the opposite sides of the solid polymer electrolyte membrane. The MEA has a seal member on its outer periphery for preventing leakage of fuel gas, coolant, or the like. The MEA is sandwiched between separators to form a power generation cell. Such power generation cells are stacked in as many layers as required for producing a desired voltage to thereby form a stack body, and end plates and the like are attached to the stack body, whereby the power generation cells are used in the form of a fuel cell stack.

In the fuel cell stack, the stack body is held between a pair of end plates from the opposite sides in the stacking direction, and the distance between the end plates is fixed with fastening members, thereby applying fastening load of a predetermined magnitude to the stack body. The fastening load is set to an appropriate magnitude that allows for sufficiently small contact resistance between an electrode and a separator or good elastic deformation of a seal member for the purpose of enhancing its sealing ability, for example (see Japanese Laid-Open Patent Publication No. 2012-185920, for instance).

For setting the fastening load to an appropriate magnitude in a manufacturing method for a fuel cell stack, a pair of end plates holding a stack body therebetween is pressed in a direction to bring the end plates closer to each other, and load acting on the stack body between the end plates is detected, for example. Then, while maintaining the pressed state of the end plates at a time when the detected value has become a magnitude corresponding to a set value for the fastening load, fastening members are attached to fix the distance between the end plates.

SUMMARY OF THE INVENTION

In a stack body constructed as above, a seal stack portion in which seal members are stacked is formed at an outer edge, and an electrode stack portion in which the electrodes of the MEA are stacked is formed inwardly of the seal stack portion. Thus, when the entire stack body is pressed via the end plates, the overall load acting on the entire stack body is applied so as to be distributed to the seal stack portion and to the electrode stack portion, so that loads having different magnitudes are applied respectively to the seal stack portion and the electrode stack portion. In particular, the difference between an electrode load acting on the electrode stack portion and the overall load tends to be larger than the difference between a seal load acting on the seal stack portion and the overall load.

If fastening load of an appropriate magnitude cannot be applied to the electrode stack portion in a fuel cell stack, the contact resistance may increase, resulting in reduced terminal voltage or damage to the MEA. Thus, the fastening load acting, in particular, on the electrode stack portion is preferably set to an appropriate magnitude. However, with the aforementioned approach that detects the overall load acting on the entire stack body via the end plates and adjusts the detected value to a magnitude corresponding to a set value for the fastening load, it is difficult to set the fastening load that will actually act on the electrode stack portion, to an appropriate magnitude.

A main object of the present invention is to provide a manufacturing method for a fuel cell stack, which is capable of applying fastening load of an appropriate magnitude to an electrode stack portion of a stack body.

Another object of the present invention is to provide a manufacturing apparatus for a fuel cell stack, which is capable of applying fastening load of an appropriate magnitude to an electrode stack portion of a stack body.

According to an aspect of the present invention, there is provided a manufacturing apparatus for a fuel cell stack for manufacturing a fuel cell stack including a stack body, a pair of end plates, and fastening members, the end plates and the fastening members being configured to press the stack body from opposite end sides in a stacking direction of the stack body to thereby apply fastening load thereto, the stack body including a plurality of power generation cells stacked together, the power generation cells each having a membrane electrode assembly and a seal member provided on an outer periphery of the membrane electrode assembly, the membrane electrode assembly containing a solid polymer electrolyte membrane and electrodes provided on opposite sides of the solid polymer electrolyte membrane, the stack body having a seal stack portion in which the seal members are stacked, and an electrode stack portion in which the electrodes are stacked. The manufacturing apparatus includes: a pressing unit configured to press the entirety of the stack body including the seal stack portion and the electrode stack portion, along the stacking direction; an overall load detection unit configured to detect an overall load acting on the entirety of the stack body when the entirety of the stack body is pressed by the pressing unit; and an electrode load detection unit configured to detect an electrode load acting on the electrode stack portion when the entirety of the stack body is pressed by the pressing unit.

The manufacturing apparatus for a fuel cell stack can detect both the overall load that acts on the entire stack body and the electrode load that acts on the electrode stack portion when the entire stack body prior to being sandwiched between the end plates is pressed by the pressing unit. From the results of detection, the relationship between the overall load on the stack body and the electrode load, or in other words, the ratio of the magnitude of the electrode load to that of the overall load, can be determined.

Thus, even after the stack body is sandwiched between the pair of end plates, the electrode load acting on the electrode stack portion via the end plates can be calculated based on the above relationship and on the result of detection of the overall load acting on the stack body via the end plates. By providing the fastening members so that the calculated result of the electrode load can be of a value corresponding to fastening load of an appropriate magnitude, fastening load of the appropriate magnitude can be applied to the electrode stack portion.

The manufacturing apparatus for the fuel cell stack preferably further includes a selection unit configured to select a thickness of a spacer which is configured to be interposed between the stack body and one of the end plates to thereby adjust a magnitude of the fastening load acting on the electrode stack portion, based on results of detection detected by the electrode load detection unit and the overall load detection unit when the stack body before being sandwiched between the end plates is pressed by the pressing unit.

From the results of detection, it is possible to know the relationship between the fastening load that will be applied to the entire stack body and the fastening load that will be applied to the electrode stack portion when the pair of end plates and the fastening members are mounted in place. By selecting the thickness of the spacer based on the above relationship, the magnitude of fastening load to be actually applied to the electrode stack portion can be accurately set.

The manufacturing apparatus for the fuel cell stack is preferably configured to: repeatedly press the stack body before being sandwiched between the end plates with the pressing unit to thereby promote initial creep, while detecting the electrode load and the overall load respectively with the electrode load detection unit and the overall load detection unit; press the end plates in a direction to bring the end plates closer to each other with the pressing unit while detecting, with the overall load detection unit, the overall load acting on the stack body via the end plates when the stack body is sandwiched between the pair of end plates; and during a setting operation for setting the fastening members to the pair of end plates in order to maintain a certain distance between the end plates, maintain a state in which the end plates are pressed by the pressing unit, so that the result of detection of the overall load is kept at a predetermined magnitude.

In this case, the initial creep can be promoted by the pressing unit while detecting the magnitude of the electrode load actually applied to the electrode stack portion with the electrode load detection unit. This makes it possible to accurately grasp the degree of progress of the initial creep in the electrode stack portion. In doing so, the overall load can be also detected by the overall load detection unit along with the electrode load, so that the relationship between the electrode load and the overall load can be determined.

In addition, the pair of end plates sandwiching therebetween the stack body in which the initial creep has been promoted as described above can be pressed in a direction to bring the end plates closer to each other by the pressing unit, and the overall load that acts on the stack body via the end plates can be detected by the overall load detection unit.

Further, the pressing unit can maintain the pressed state in which the end plates are pressed when the result of detection of the overall load by the overall load detection unit is of a predetermined magnitude. The predetermined magnitude is a value at which a calculated result of the electrode load based on the relationship between the overall load and the electrode load and on the result of detection of the overall load is determined to be of a magnitude corresponding to an appropriate fastening load. Thus, by fixing the distance between the end plates with the fastening members in this state, a fuel cell stack with fastening load of an appropriate magnitude applied to the electrode stack portion can be obtained.

According to another aspect of the present invention, there is provided a manufacturing method for a fuel cell stack including a stack body, a pair of end plates, and fastening members, the end plates and the fastening members being configured to press the stack body from opposite end sides in a stacking direction of the stack body to thereby apply fastening load thereto, the stack body including a plurality of power generation cells stacked together, the power generation cells each having a membrane electrode assembly and a seal member provided on an outer periphery of the membrane electrode assembly, the membrane electrode assembly containing a solid polymer electrolyte membrane and electrodes provided on opposite sides of the solid polymer electrolyte membrane, the stack body having a seal stack portion in which the seal members are stacked, and an electrode stack portion in which the electrodes are stacked. The manufacturing method includes: a load detection step of, when the entirety of the stack body including the seal stack portion and the electrode stack portion is pressed by pressing unit along the stacking direction, detecting an overall load acting on the entire stack body, with an overall load detection unit, and detecting an electrode load acting on the electrode stack portion with an electrode load detection unit; a pressing step of sandwiching the stack body between the pair of end plates, and pressing the end plates in a direction to bring the end plates closer to each other with the pressing unit while detecting the overall load acting on the stack body via the end plates with the overall load detection unit; and a fastening step of fixing a distance between the end plates with the fastening members while maintaining a pressed state in which the end plates are pressed when a result of detection of the overall load in the pressing step has become a predetermined magnitude which is based on a relationship between the overall load and the electrode load detected in the load detection step.

The manufacturing method for a fuel cell stack can determine the relationship between the overall load on the stack body and the electrode load from the result of detection in the load detection step. Thus, based on the relationship and the result of detection of the overall load from the pressing step, the electrode load that acts on the electrode stack portion via the end plates can be calculated. Accordingly, by setting the fastening members in the fastening step so that the calculated result of the electrode load is of a value corresponding to fastening load of an appropriate magnitude, a fuel cell stack with fastening load of the appropriate magnitude applied to the electrode stack portion can be obtained.

The manufacturing method for the fuel cell stack preferably further includes a spacer selection step of selecting, with a selection unit, a thickness of a spacer which is configured to be interposed between the stack body and one of the end plates to thereby adjust a magnitude of the fastening load acting on the electrode stack portion, based on the relationship obtained in the load detection step. In the pressing step, the spacer of the thickness selected in the spacer selection step and the stack body are sandwiched between the pair of end plates.

From the results of detection in the load detection step, it is possible to know the relationship between the fastening load that will be applied to the entire stack body and the fastening load that will be applied to the electrode stack portion when the pair of end plates and the fastening members are set in place. By selecting the thickness of the spacer in the spacer selection step based on the relationship and interposing the spacer between one of the end plates and the stack body, the magnitude of fastening load to be actually applied to the electrode stack portion can be accurately set.

In the manufacturing method for the fuel cell stack, preferably, in the load detection step, the entire stack body is repeatedly pressed along the stacking direction by the pressing unit to thereby promote initial creep, while detecting the overall load and the electrode load with the overall load detection unit and the electrode load detection unit.

In this case, the initial creep can be promoted while detecting the magnitude of the electrode load actually applied to the electrode stack portion in the load detection step, thus making it possible to accurately grasp the degree of progress of the initial creep in the electrode stack portion. As a result, fastening load of an appropriate magnitude can be applied to the electrode stack portion after shrinking in the stacking direction due to progress of the initial creep, and thus it is possible to effectively suppress reduction of the fastening load over time (load loss).

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A manufacturing method and apparatus for a fuel cell stack according to the present invention will now be described in detail by showing preferred embodiments with reference to the attached drawings.

Figure 1:
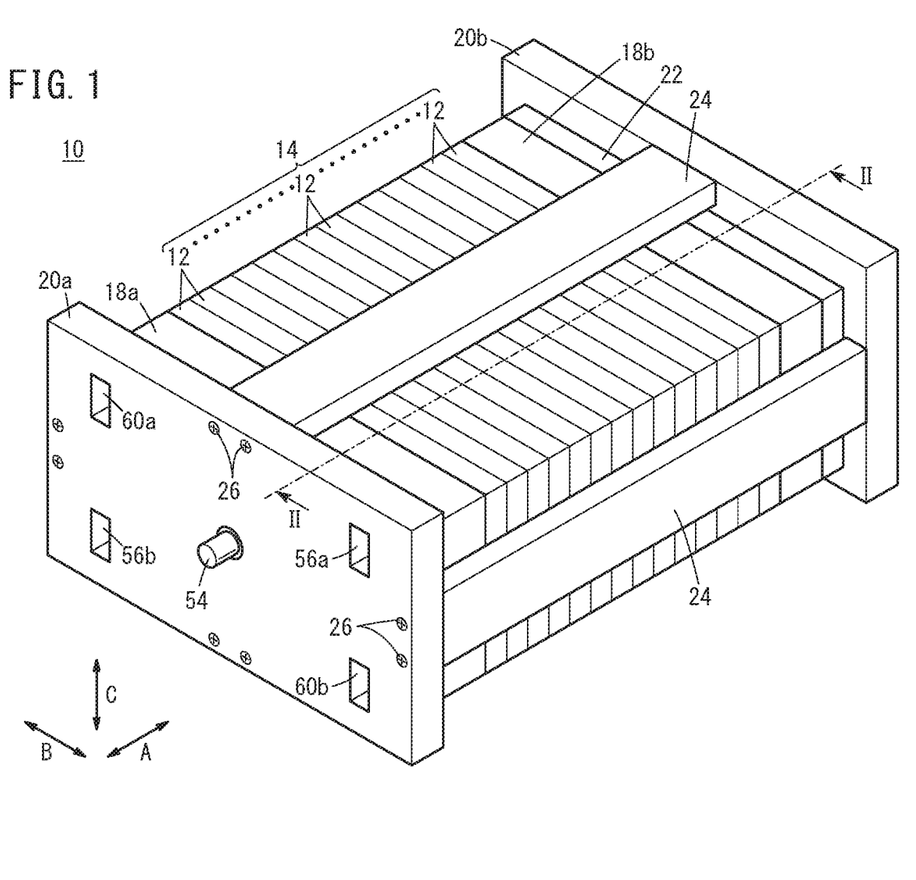
FIG. 1 is a perspective view of a fuel cell stack obtained by a manufacturing method for a fuel cell stack according to an embodiment of the present invention.
Figure 2:
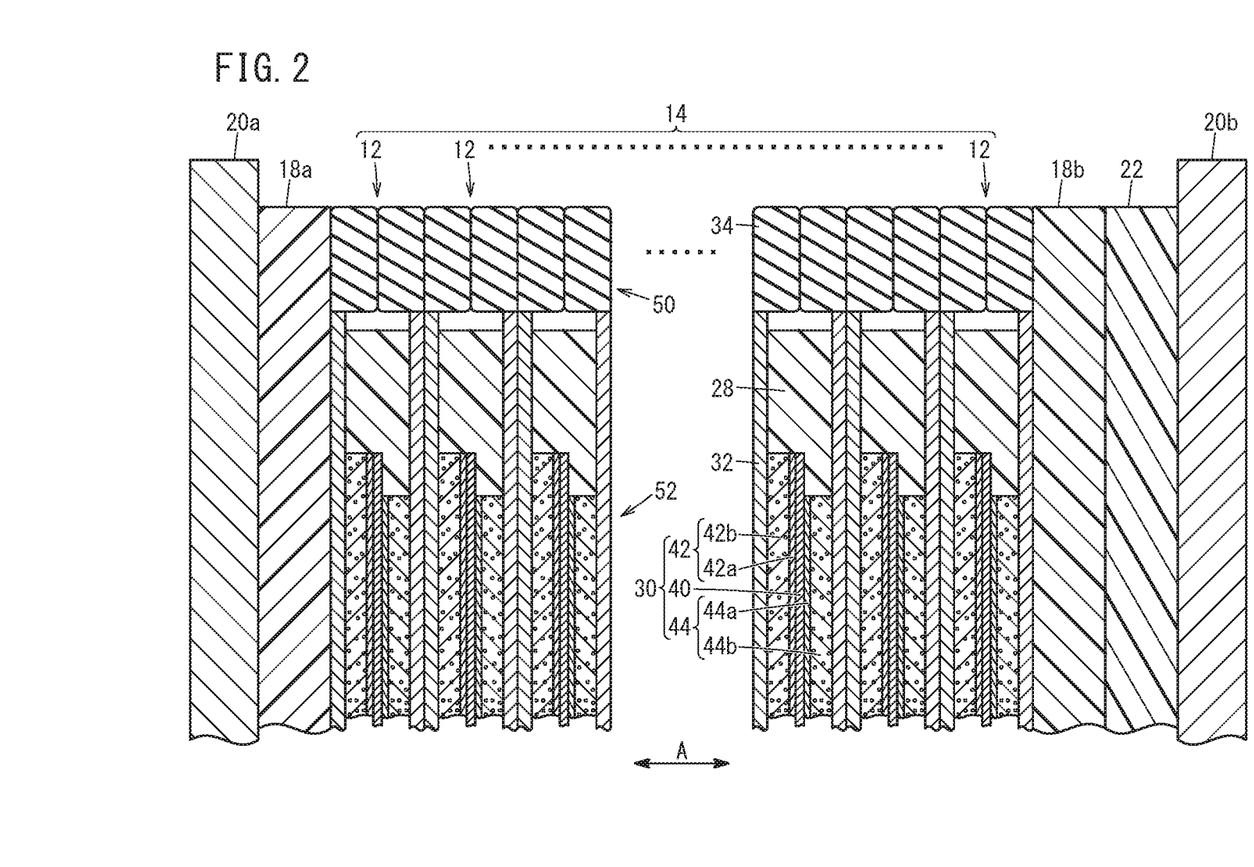
FIG. 2 is a cross sectional view taken along line II-II in FIG. 1.

FIG. 1 is a perspective view of a fuel cell stack 10 obtained by the manufacturing method for a fuel cell stack according to an embodiment (hereinafter, also referred to as just "manufacturing method"). FIG. 2 is a cross sectional view taken along line II-II in FIG. 1. The fuel cell stack 10 includes a stack body 14 containing multiple power generation cells 12 stacked in the horizontal direction (the direction of arrow A) or the direction of gravity (the direction of arrow C).

At one end of the stack body 14 in the stacking direction (the direction of arrow A), an insulator 18a is provided, and an end plate 20a is provided on the insulator 18a (see FIG. 2). At the other end of the stack body 14 in the stacking direction, an insulator 18b is provided, a spacer 22 is provided on the insulator 18b, and an end plate 20b is provided on the spacer 22.

As shown in FIG. 1, the end plates 20a, 20b have a rectangular shape, and coupling bars 24 are arranged between the sides of the end plates 20a, 20b. Both ends of each coupling bar 24 are fixed respectively to the inner surfaces of the end plates 20a, 20b via bolts 26. That is, by fixing the distance between the end plates 20a, 20b with the coupling bars 24 and the bolts 26 (fastening members), fastening load in the stacking direction (the direction of arrow A) can be applied to the stacked multiple power generation cells 12.

In the power generation cell 12, a membrane electrode assembly (MEA) 30 equipped with a resin frame member 28 is sandwiched between separators 32. The separator is made of electrically conductive material, such as metal and carbon, and a seal member 34 is provided so as to circumferentially extend around the outer peripheral end of the separator. The seal member 34 is made of elastic material, such as rubber.

The MEA 30 has a solid polymer electrolyte membrane (a cation exchange membrane) 40, made of a thin film of perfluorosulfonic acid impregnated with water, for example, and an anode 42 and a cathode 44 sandwiching the solid polymer electrolyte membrane 40 therebetween. Hereinafter, the anode 42 and the cathode 44 may also be generally called "electrode".

The cathode 44 has a smaller planer size (outer size) than that of the solid polymer electrolyte membrane 40 and the anode 42. Alternatively, the anode 42 may be configured to have a smaller planer size than that of the solid polymer electrolyte membrane 40 and the cathode 44. Further, the anode 42, the cathode 44, and the solid polymer electrolyte membrane 40 may have an identical planer size.

The anode 42 has a first electrode catalyst layer 42a joined to one surface of the solid polymer electrolyte membrane 40, and a first gas diffusion layer 42b joined to the first electrode catalyst layer 42a. The first electrode catalyst layer 42a and the first gas diffusion layer 42b have an identical outer size.

The cathode 44 has a second electrode catalyst layer 44a joined to the other surface of the solid polymer electrolyte membrane 40, and a second gas diffusion layer 44b joined to the second electrode catalyst layer 44a. The second electrode catalyst layer 44a and the second gas diffusion layer 44b have an identical (or different) outer size.

The first electrode catalyst layer 42a is formed by uniformly depositing porous carbon particles supporting thereon a platinum alloy, on the surface of the first gas diffusion layer 42b, for example. The second electrode catalyst layer 44a is formed by uniformly depositing porous carbon particles supporting thereon a platinum alloy, on the surface of the second gas diffusion layer 44b, for example. The first gas diffusion layer 42b and the second gas diffusion layer 44b are made of carbon paper, carbon cloth, or the like.

The resin frame member 28 has a shape of a frame, which circumferentially extends around the outer periphery of the solid polymer electrolyte membrane 40 and is joined to the anode 42 and the cathode 44. The MEA 30 may not necessarily have the resin frame member 28.

At the outer edge of the stack body 14 having multiple stacked power generation cells 12 as structured above, a seal stack portion 50 in which the seal members 34 are stacked is formed. Further, an electrode stack portion 52 in which electrodes are stacked is formed inwardly of the seal stack portion 50 of the stack body 14.

As shown in FIG. 1, terminal portions 54 extending outward in the stacking direction are provided substantially at the center of the principal surfaces of the end plates 20a, 20b, respectively. The terminal portion on the side of the end plate 20b is not shown in the drawing. The terminal portions 54 pass respectively through the insulators 18a, 18b and are electrically connected with the stack body 14. The insulators 18a, 18b are made of insulating material, such as polycarbonate (PC) or phenol resin.

The spacer 22 is made of resin, and its thickness is adjusted so that an appropriate fastening load is applied to the stack body 14, as discussed later.

At one end of the fuel cell stack 10 in a long-side direction (the direction of arrow B) of the fuel cell stack 10, an oxygen-containing gas inlet passage 56a, a coolant inlet passage (not shown), and a fuel gas outlet passage 60b are provided. The oxygen-containing gas inlet passage 56a, the coolant inlet passage, and the fuel gas outlet passage 60b extend through the fuel cell stack 10 in the direction of arrow A (the stacking direction). An oxygen-containing gas is supplied through the oxygen-containing gas inlet passage 56a, and a coolant is supplied through the coolant inlet passage. A fuel gas, such as hydrogen-containing gas, is discharged through the fuel gas outlet passage 60b.

At the other end of the fuel cell stack 10 in the direction of arrow B, a fuel gas inlet passage 60a, a coolant outlet passage (not shown), and an oxygen-containing gas outlet passage 56b are provided. The fuel gas inlet passage 60a, the coolant outlet passage (not shown), and the oxygen-containing gas outlet passage 56b extend through the fuel cell stack 10 in the direction of arrow A. A fuel gas is supplied through the fuel gas inlet passage 60a, the coolant is discharged through the coolant outlet passage, and an oxygen-containing gas is discharged through the oxygen-containing gas outlet passage 56b.

Figure 3:
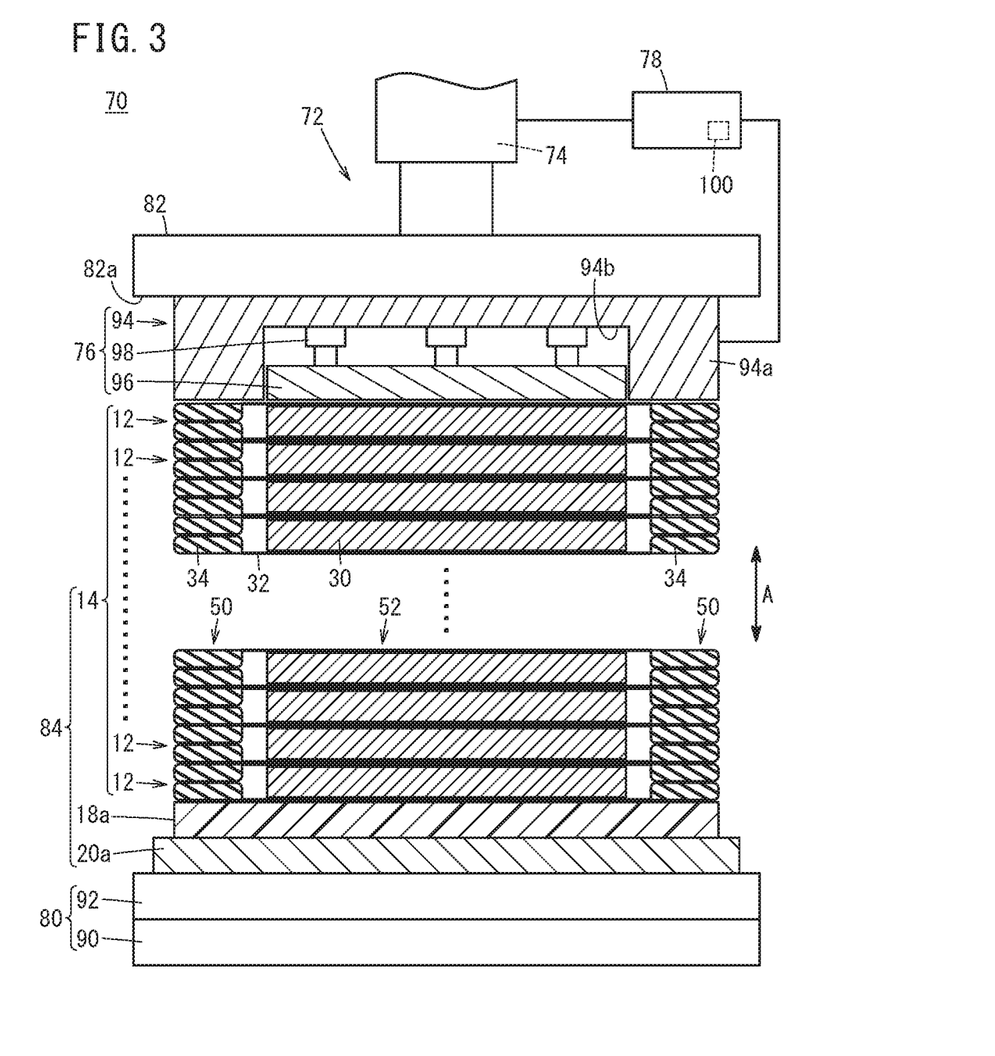
FIG. 3 is an explanatory view illustrating a load detection step by means of a manufacturing apparatus for a fuel cell stack according to the embodiment.

Next, referring to FIGS. 3 and 4, a manufacturing apparatus for a fuel cell stack (hereinafter also referred to as just "manufacturing apparatus") 70 according to this embodiment will be described. The manufacturing apparatus 70 mainly includes a pressing unit 72, an overall load detection unit 74, an electrode load detection unit 76, and a control unit 78.

The pressing unit 72 is composed of a pressing mechanism, such as a servo press, and can apply load to a target object placed between a pressing plate 82 and a holding base 80 by moving the pressing plate 82 toward or away from the holding base 80. The target object may include a first stack body 84 in which the end plate 20a, the insulator 18a, and the stack body 14 are stacked in this order from the holding base 80 side (see FIG. 3) as described later. The target object may also include a second stack body 86 with a pressing jig 88 attached thereto, the second stack body 86 being formed by stacking the first stack body 84, the insulator 18b, the spacer 22, and the end plate 20b in this order (see FIG. 4) as described later.

The pressing jig 88 is shaped so as to be able to apply load to the second stack body 86 substantially uniformly via the pressing plate 82 by being interposed between the end plate 20b and the pressing plate 82, even when the end plate 20b has a protruding terminal portion, for example.

The holding base 80 has a base 90, and a placement jig 92 interposed between the base 90 and the target object. The placement jig 92 is shaped such that the end plate 20a with the protruding terminal portion 54 can be stably placed horizontally thereon, for example.

The overall load detection unit 74 is composed of a load cell contained in the pressing unit 72, for example. The overall load detection unit 74 detects the load acting on the pressing plate 82 pressed against the target object, and outputs the result of detection to the control unit 78. That is, the overall load detection unit 74 can detect the overall load acting on the entire stack body 14 including the seal stack portion 50 and the electrode stack portion 52, when the first stack body 84 or the second stack body 86 with the pressing jig 88 attached thereto is the target object.

The electrode load detection unit 76 includes a fixed member 94 fixed to a surface 82a of the pressing plate 82 that faces the target object, a movable plate 96 which can be moved relative to the fixed member 94, and multiple load cells 98 disposed between the fixed member 94 and the movable plate 96.

The fixed member 94 includes an extending portion 94a, and a recess 94b, an outer periphery of the recess 94b being surrounded by the extending portion 94a. The extending portion 94a extends from the surface 82a of the pressing plate 82 so as to abut against the seal stack portion 50 of the stack body 14 when the first stack body 84 is the target object. The movable plate 96 is provided so as to be movable in the recess 94b along the inner wall surface of the extending portion 94a, so that the movable plate 96 can abut against the electrode stack portion 52 of the stack body 14.

The load cells 98 are disposed between the bottom wall of the recess 94b and the movable plate 96. The load cells 98 detect the load acting on the movable plate 96 pressed against the electrode stack portion 52 as the pressing plate 82 approaches the first stack body 84, and output the detection result to the control unit 78. That is, the electrode load detection unit 76 can detect the electrode load acting on the electrode stack portion 52 when the pressing unit 72 presses the entirety of the first stack body 84 (the stack body 14).

The overall load detection unit 74 and the electrode load detection unit 76 are arranged in series in a direction in which the load acts on the pressing plate 82. Thus, it is possible to detect both of the overall load and the electrode load when the pressing unit 72 presses the first stack body 84.

The control unit 78 can control the pressing unit 72 or perform calculation based on results of detection from the overall load detection unit 74 and the electrode load detection unit 76 or the like. The control unit 78 is also configured to include a selection unit 100 for selecting an appropriate thickness of the spacer 22 based on the results of detection.

The manufacturing apparatus 70 may further include a displacement sensor (not shown) for detecting an amount of displacement of the first stack body 84 in the stacking direction. The amount of displacement detected by the displacement sensor is also sent to the control unit 78.

The manufacturing method according to this embodiment by means of the manufacturing apparatus 70 will be now described. To start with, the first stack body 84 is set between the holding base 80 and the pressing plate 82. Next, as shown in FIG. 3, the pressing plate 82 is moved toward the holding base 80 with the pressing unit 72 so that the extending portion 94a of the electrode load detection unit 76 comes into abutment against the seal stack portion 50 and the movable plate 96 comes into abutment against the electrode stack portion 52, whereby a load detection step is performed.

In the load detection step, the pressing plate 82 is repeatedly moved back and forth along the stacking direction by the pressing unit 72, while both the overall load acting on the entire first stack body 84 (stack body 14) and the electrode load acting on the electrode stack portion 52 are detected with the overall load detection unit 74 and the electrode load detection unit 76. In this way, aging treatment for promoting initial creep is performed by repeated pressing of the first stack body 84 in its entirety.

In doing so, the initial creep can be promoted based on the electrode load actually applied to the electrode stack portion 52. Accordingly, compared to a case of promoting the initial creep based on the overall load, for example, the aging treatment can be performed while precisely grasping the degree of progress of the initial creep in the electrode stack portion 52.

Also, in the aging treatment, as the first stack body 84 in its entirety is repeatedly pressed in the above manner, it is possible to obtain multiple sets of detection results by the overall load detection unit 74 and the electrode load detection unit 76. Based on the multiple detection results, the relationship of magnitude between the overall load and the electrode load (the actual load relationship) in the first stack body 84, or in other words, the ratio of the magnitude of the electrode load to that of the overall load, can be determined with high accuracy.

Then, based on the actual load relationship obtained in the load detection step, a selection step for selecting the thickness of the spacer 22 is performed by the selection unit 100. From the actual load relationship, it is possible to know the relationship between the fastening load that will be applied to the entire stack body 14 and the fastening load that will be applied to the electrode stack portion 52 when the end plates 20a, 20b and the fastening members are mounted in place. From this relationship of fastening load, it is possible to obtain a calculation setting value for the fastening load that will be applied to the entire stack body 14 when the fastening load of an appropriate magnitude is applied to the electrode stack portion 52. By predetermining an appropriate thickness of the spacer 22 depending on the magnitude of the calculation setting value, the spacer 22 of an appropriate thickness can be selected for each fuel cell stack 10. Thus, it is possible to accurately perform setting such that the fastening load to be actually applied to the electrode stack portion 52 can be of an appropriate magnitude.

Next, the pressing plate 82 is moved in a direction away from the holding base 80 by the pressing unit 72, and thereafter the insulator 18b, the spacer 22 of the thickness selected in the selection step, and the end plate 20b are stacked in this order on the first stack body 84, thereby forming the second stack body 86. Further, the pressing jig 88 is attached to the end plate 20b of the second stack body 86.

Figure 4:
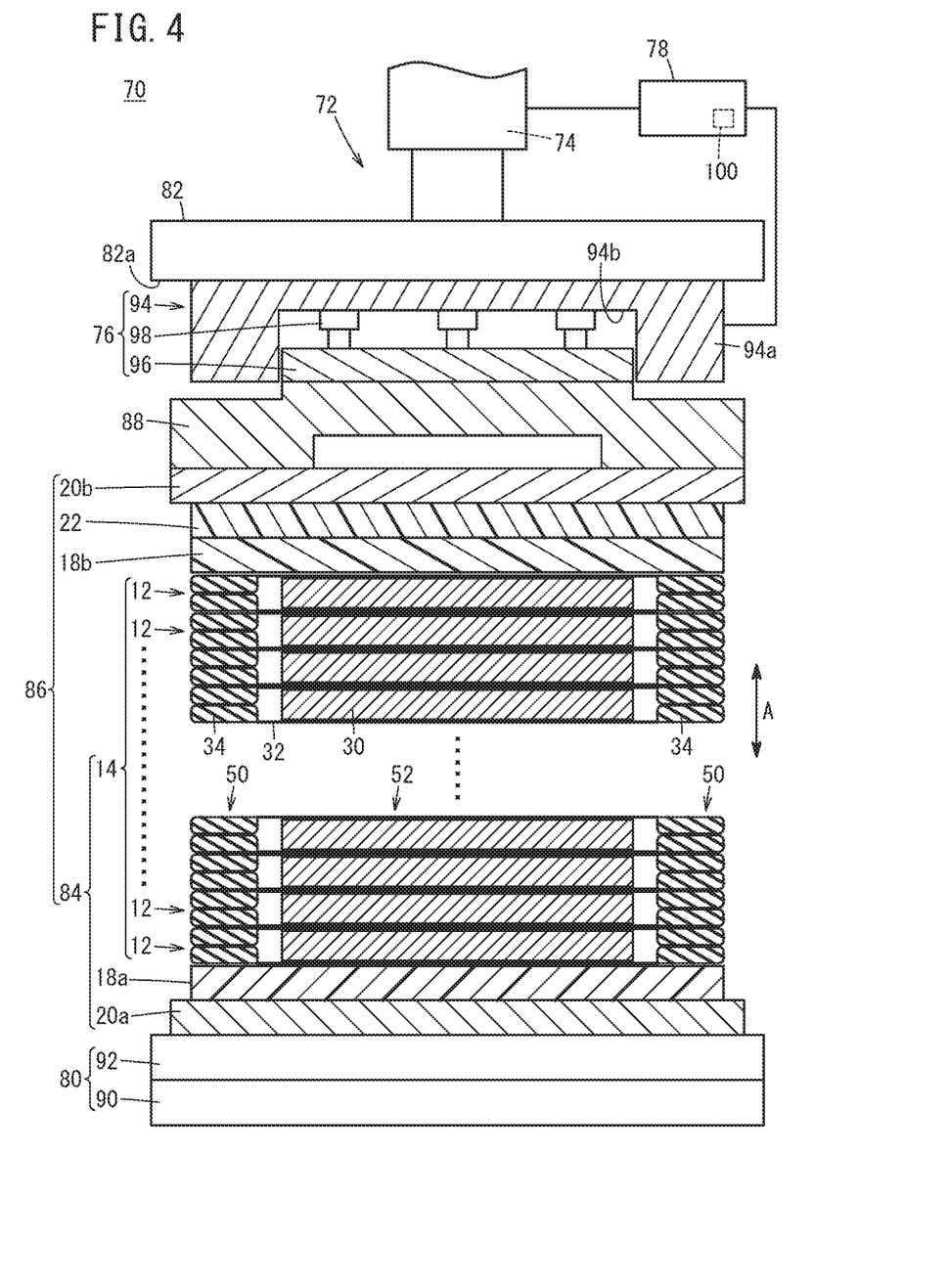
FIG. 4 is an explanatory view illustrating a pressing step by means of the manufacturing apparatus for the fuel cell stack of FIG. 3.

Next, as shown in FIG. 4, a pressing step is performed by moving the pressing plate 82 toward the holding base 80 with the pressing unit 72 to bring the movable plate 96 and the like of the electrode load detection unit 76 into abutment against the pressing jig 88. That is, in the pressing step, the stack body 14 is sandwiched between a pair of end plates 20a, 20b, and the end plates 20a, 20b are pressed in a direction to bring the end plates closer to each other by the pressing unit 72 while detecting the overall load acting on the stack body 14 via the end plates 20a, 20b with the overall load detection unit 74.

When the result of detection of the overall load has become equal to the calculation setting value, a fastening step is performed to fix the distance between the end plates 20a, 20b with the fastening members while maintaining the pressed state vie the end plates 20a, 20b by the pressing unit 72. As a result, a fuel cell stack 10 with fastening load of an appropriate magnitude applied to the electrode stack portion 52 can be obtained.

That is, the manufacturing method and manufacturing apparatus 70 can detect both the overall load that acts on the stack body 14 in its entirety and the electrode load that acts on the electrode stack portion 52 when the entire stack body 14 prior to being sandwiched between the end plates 20a, 20b is pressed by the pressing unit 72. From the results of detection, the actual load relationship between the overall load on the stack body 14 and the electrode load can be determined.

Thus, even after the stack body 14 is sandwiched between the end plates 20a, 20b, an electrode load acting on the electrode stack portion 52 via the end plates 20a, 20b can be calculated based on the above relationship and on the result of detection of the overall load acting on the stack body 14 via the end plates 20a, 20b. By providing the fastening members so that the calculated result of the electrode load can be of a value corresponding to fastening load of an appropriate magnitude, fastening load of the appropriate magnitude can be applied to the electrode stack portion 52.

In addition, since the degree of progress of the initial creep in the electrode stack portion 52 can be accurately grasped as noted above, fastening load of an appropriate magnitude can be accurately applied to the electrode stack portion 52 after shrinking in the stacking direction due to progress of the initial creep. Thus, it is possible to effectively suppress the reduction of the fastening load applied to the electrode stack portion 52 over time (load loss), and hence advantageously it is possible to avoid increase of the contact resistance between an electrode and a separator and/or damage to the MEA 30.

The present invention is not intended to be limited to the above-described embodiment but various modifications may be made without departing from the scope of the present invention.

What is claimed is:

1. A manufacturing apparatus for a fuel cell stack, for manufacturing a fuel cell stack including a stack body, a pair of end plates, and fastening members, the end plates and the fastening members being configured to press the stack body from opposite end sides in a stacking direction of the stack body to thereby apply fastening load thereto, the stack body including a plurality of power generation cells stacked together, the power generation cells each having a membrane electrode assembly and a seal member provided on an outer periphery of the membrane electrode assembly, the membrane electrode assembly containing a solid polymer electrolyte membrane and electrodes provided on opposite sides of the solid polymer electrolyte membrane, the stack body having a seal stack portion in which the seal members are stacked, and an electrode stack portion in which the electrodes are stacked, the manufacturing apparatus comprising:

a pressing unit configured to press an entirety of the stack body including the seal stack portion and the electrode stack portion, along the stacking direction;

an overall load detection unit configured to detect an overall load acting on the entirety of the stack body when the entirety of the stack body is pressed by the pressing unit; and an electrode load detection unit interposed between the pressing unit and the stack body and configured to detect an electrode load acting on the electrode stack portion when the entirety of the stack body is pressed by the pressing unit;

wherein the electrode load detection unit comprising:

a fixed member including an extending portion capable of pressing the seal stack portion and a recess surrounded by the extending portion;

a movable plate movable in the recess along an inner wall surface of the extending portion and capable of pressing the electrode stack portion; and a load cell disposed between the fixed member and the movable plate, the overall load detection unit and the electrode load detection unit are arranged in series in a pressing direction by the pressing unit.

2. The manufacturing apparatus for the fuel cell stack according to claim 1, further comprising:

a selection unit configured to select a thickness of a spacer which is configured to be interposed between the stack body and one of the end plates to thereby adjust a magnitude of the fastening load acting on the electrode stack portion, based on results of detection detected by the electrode load detection unit and the overall load detection unit when the stack body before being sandwiched between the end plates is pressed by the pressing unit.

3. The manufacturing apparatus for the fuel cell stack according to claim 1, wherein the manufacturing apparatus is configured to:

repeatedly press the stack body before being sandwiched between the end plates with the pressing unit to thereby promote initial creep, while detecting the electrode load and the overall load respectively with the electrode load detection unit and the overall load detection unit;

press the end plates in a direction to bring the end plates closer to each other with the pressing unit while detecting, with the overall load detection unit, the overall load acting on the stack body via the end plates when the stack body is sandwiched between the pair of end plates; and during a setting operation for setting the fastening members to the pair of end plates in order to maintain a certain distance between the end plates, maintain a state in which the end plates are pressed by the pressing unit, so that a result of detection of the overall load is kept at a predetermined magnitude.

4. A manufacturing method for a fuel cell stack including a stack body, a pair of end plates, and fastening members, the end plates and the fastening members being configured to press the stack body from opposite end sides in a stacking direction of the stack body to thereby apply fastening load thereto, the stack body including a plurality of power generation cells stacked together, the power generation cells each having a membrane electrode assembly and a seal member provided on an outer periphery of the membrane electrode assembly, the membrane electrode assembly containing a solid polymer electrolyte membrane and electrodes provided on opposite sides of the solid polymer electrolyte membrane, the stack body having a seal stack portion in which the seal members are stacked, and an electrode stack portion in which the electrodes are stacked, the manufacturing method comprising:

a load detection step of, when an entirety of the stack body including the seal stack portion and the electrode stack portion having an electrode load detection unit interposed between the pressing unit and the stack body is pressed by a pressing unit along the stacking direction, detecting an overall load acting on the entirety of the stack body, with an overall load detection unit, and detecting an electrode load acting on the electrode stack portion with an electrode load detection unit, wherein the overall load detection unit and the electrode load detection unit are arranged in series in a pressing direction by the pressing unit;

a pressing step of sandwiching the stack body between the pair of end plates, and pressing the end plates in a direction to bring the end plates closer to each other with the pressing unit while detecting the overall load acting on the stack body via the end plates with the overall load detection unit; and a fastening step of fixing a distance between the end plates with the fastening members while maintaining a pressed state in which the end plates are pressed when a result of detection of the overall load in the pressing step has become a predetermined magnitude which is based on a relationship between the overall load and the electrode load detected in the load detection step.

5. The manufacturing method for the fuel cell stack according to claim 4, further comprising:

a spacer selection step of selecting, with a selection unit, a thickness of a spacer which is configured to be interposed between the stack body and one of the end plates to thereby adjust a magnitude of the fastening load acting on the electrode stack portion, based on the relationship obtained in the load detection step, wherein in the pressing step, the spacer of the thickness selected in the spacer selection step and the stack body are sandwiched between the pair of end plates.

6. The manufacturing method for the fuel cell stack according to claim 4, wherein in the load detection step, an entirety of the stack body is repeatedly pressed along the stacking direction by the pressing unit to thereby promote initial creep, while detecting the overall load and the electrode load with the overall load detection unit and the electrode load detection unit.

* * * * *